3,307,905
PROCESS FOR THE MANUFACTURE OF HYDROGEN CYANIDE AND ACETIC ACID FROM OXIMINOACETONE
Hans Fernholz, Bad Soden, Taunus, and Helmut Gössel, Frankfurt am Main, Germany, assignors to Farbwerke Hoechst Aktiengesellschaft vormals Meister Lucius & Bruning, Frankfurt am Main, Germany, a corporation of Germany
No Drawing. Filed Aug. 12, 1963, Ser. No. 301,591
Claims priority, application Germany, Oct. 10, 1962, F 38,002
11 Claims. (Cl. 23—151)

The present invention relates to a process for the manufacture of hydrogen cyanide and acetic acid from oximinoacetone.

Nowadays hydrogen cyanide is produced in industry either by reacting hydrocarbons, for example methane, with ammonia in the presence of platinum catalysts at a temperature in the range of from 900 to 1,200° C., or by reacting carbon monoxide with ammonia at high temperature, or by dehydrating formamide at 370° C.

Acetic acid is produced on an industrial scale by catalytic oxidation of alcohol, acetaldehyde or low molecular weight hydrocarbons, in the latter case the acetic acid obtained being contaminated with high molecular weight fatty acids.

It has now been found that hydrogen cyanide and acetic acid can be produced by decomposing oximinoacetone. The reaction is carried out in a solvent in the presence of catalytic amounts of an acylating agent at a temperature in the range of from 100 to 200° C.

In the reaction the oximino group of an amount of oximinoacetone equivalent to the amount of acylating agent is first acylated. At the high temperature applied the acyl compound then undergoes a thermal decomposition whereby acetyl cyanide and the basic acid of the acylating agent are formed. The acetyl cyanide produced in this starting reaction then reacts with oximinoacetone to acetyl-oximinoacetone while hydrogen cyanide is set free. The acetyl-oximinoacetone is decomposed under the action of heat to form acetyl cyanide and acetic acid. The reaction further proceeds autocatalytically.

The reaction is illustrated by way of the following scheme:

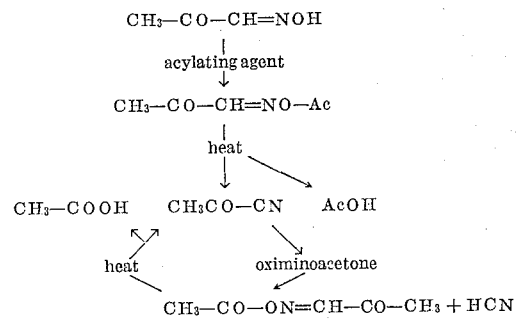

$CH_3-CO-ON=CH-CO-CH_3 + HCN$

The process can be carried out either in discontinuous or in continuous manner. The oximinoacetone is dissolved in a suitable solvent, the catalyst is added and the mixture is heated to the reaction temperature. The hydrogen cyanide set free escapes and is suitably condensed by intensive cooling. If the reaction temperature is near the boiling point of the solvent used, or of the acetic acid formed in the reaction, it is necessary to separate the hydrogen cyanide, the acetyl cyanide and the acetic acid from one another and from the solvent used in known manner, preferably by condensation. When operating in continuous manner the acetyl cyanide withdrawn from the reaction space is recycled into the reaction zone where it is reacted with freshly supplied oximinoacetone.

It is suitable first to heat the acylating agent in a solvent to the required reaction temperature and then to meter in the oximinoacetone either in substance or as a solution in a solvent. When operating in this manner the exothermal decomposition reaction can be controlled in an especially easy way.

Alternatively, the solution of oximinoacetone in acetone obtained according to the process of Belgian Patent 610,194 can be used. After having neutralized the acid catalyst used in this reaction the acetone is removed by distillation while the solvent used for the decomposition is supplied. This mode of operation avoids the difficulties encountered in the later distillative separation of acetone and hydrogen cyanide, on the one hand, and the isolation of the oximinoacetone, on the other. The oximinoacetone contained in the said solution is decomposed, after the addition of an acylating agent, in the manner described above into hydrogen cyanide and acetic acid.

Acylating agents which can be used in the reaction are especially organic acid anhydrides, for example organic carboxylic anhydrides such as acetic anhydride and other simple or mixed anhydrides of low molecular weight aliphatic carboxylic acids preferably having up to 5 carbon atoms, for example propionic anhydride and the mixed anhydride of acetic acid and propionic acid; organic acid halides, particularly acid chlorides and bromides, for example acetyl chloride, propionyl chloride, acetyl bromide, benzoyl chloride and p-toluene-sulfochloride and other chlorides and bromides of low molecular weight aliphatic carboxylic acids and low homologs or simple derivatives of benzoic acid; cyanides of low molecular weight aliphatic carboxylic acids, for example acetyl cyanide, and benzoyl cyanide. Likewise suitable are ketene and its low homologs.

It is especially suitable to use derivatives of acetic acid, i.e. acetic anhydride, acetyl chloride, acetyl bromide, acetyl cyanide or mixtures thereof, because in this case foreign acids need not be removed.

In the starting reaction the acylating agent is suitably added in an amount of 0.1 to 0.5 mol, preferably 0.15 to 0.25 mol, calculated on the weight of the oximinoacetone first introduced into the reaction vessel. Owing to the autocatalysis taking place it is not necessary to add further amounts of acylating agent, so that with a continuous operation the above specified amounts of acylating agent are sufficient over a long period of time.

As solvents there can be used those organic substances which are inert towards the reactants and liquid at the reaction temperature. There are mentioned by way of example carboxylic acids such as acetic acid and propionic acid; acid anhydrides such as acetic anhydride; aromatic hydrocarbons and halohydrocarbons such as toluene, xylene, chlorobenzene or orth- and meta-dichlorobenzene; ethers such as di-n-butyl ether and glycol ethers such as di-ethylene glycol di-n-butyl ether, esters such as benzoic acid benzyl ester. The solvents used shall preferably have a boiling point above 120° C. When acid anhydrides are use as solvent, for example acetic anhydride, which simultaneously act as acylating agent, it is not necessary to add a further acylating agent.

The reaction temperatures applied depend on the acylating agent used. When acetyl compounds are used as acylating agents, which directly form acetyl-oximinoacetone with oximinoacetone, the thermal decomposition of the acetyl-oximinoacetone to acetyl cyanide and acetic acid takes place at a temperature in the range of from 100° C. to 140° C.; in these cases working temperatures in the range of from 110° C. to 160° C. being therefore preferred.

With the use of solvents having a boiling point above 125°C. to 135° C. the reaction is carried out at atmospheric pressure. In the case of solvents having a lower boiling point the reaction must be carried out under a slight superatmospheric pressure provided that reaction temperatures above the normal boiling point of the said solvents are required. It is particularly favorable to use acetic acid as solvent and to operate under superatmospheric pressure, for example a pressure of up to 10 atmospheres since acetic acid is formed as decomposition product during the reaction. When the reaction is carried out under pressure the hydrogen cyanide formed must be continuously removed from the autoclave.

The following examples serve to illustrate the invention but they are not intended to limit it thereto.

EXAMPLE 1

A mixture of 50 grams of xylene and 2 grams of acetyl cyanide was introduced into a three-necked flask provided with reflux condenser and thermometer, the mixture was heated to boil and a solution of 50 grams of oximinoacetone in 100 cc. of xylene was dropped in at a temperature of 130° C. A current of warm water of 40° C. flowed through the reflux condenser. At the head of the condenser was provided with a distillation bridge for continuously removing the hydrogen cyanide formed. The hydrogen cyanide was condensed in a receiver cooled to −10° C. The reflux condenser was then replaced by a fractionating column. The acetic acid formed and the acetylcyanide were separated from the xylene by distillation. The yields of acetic acid and hydrogen cyanide were almost quantitative.

EXAMPLE 2

8 grams of acetyl chloride and 20 cc. of propionic acid were heated with reflux in the apparatus described in Example 1. A solution of 50 grams of oximinoacetone in 100 cc. of propionic acid was slowly dropped into the boiling solution, the reaction temperature being 135° C. Practically quantitatives yields of acetic acid and hydrogen cyanide were obtained. The same results were obtained when 12.5 grams (0.12 mol) of acetic anhydride were used instead of 8 grams of acetyl chloride.

EXAMPLE 3

50 grams of oximinoacetone were dissolved in 200 cc. of acetic anhydride and the solution was slowly heated to boil. A current of nitrogen was passed through the reaction solution. Instead of the distillation bridge two wash bottles with frits each containing a 20% solution of sodium hydroxide were arranged at the outlet of the reflux condenser. After about 30 minutes a nitrogen current moist with water was used for hydrolizing unreacted acetyl chloride. The reaction temperature amounted to 125° C. The yields of acetic acid and hydrogen cyanide were practically quantitative.

EXAMPLE 4

A 25% oximinoacetone solution in acetone as obtained in the manufacture of oximinoacetone from acetone and nitrous gases was freed from inorganic acid constituents with the aid of a basic ion exchanger. To the solution still having a weakly acid reaction glacial acetic acid was added continuously in an amount such that a 33% solution of oximinoacetone in glacial acetic acid was obtained. The solution was continuously introduced into the center of a fractionating column heated at 90° C. The acetone in excess was condensed at the head of the column and recycled for being reacted with nitrous gases. In the sump of the column accumulated an about 33% solution of oximinoacetone in acetic acid, which was pumped with the aid of a dosing pump into the center of a pressure column filled with Raschig rings. This column had a temperature of 140° C. and was charged with acetic acid and 20 grams of acetyl cyanide. Owing to the vapor pressure of the acetic acid and the hydrogen cyanide formed a pressure of about 5 atmospheres adjusted in the column. The pressure was reduced to about 3 atmospheres over a release valve and maintained constant. The gas set free by the pressure release was condensed and subjected to a fractional distillation. At the head of the column hydrogen cyanide and the acetyl cyanide were separated. The acetic acid was obtained as sump product and purified by fractional distillation. The isolated acetyl cyanide was recycled into the pressure column. The yields of hydrogen cyanide and acetic acid were practically quantitative.

We claim:

1. A process for the preparation of hydrogen cyanide and acetic acid which comprises reacting oximinoacetone with a catalytic amount of an organic acylating agent at a temperature in the range of from 100° C. to 200° C.

2. A process as defined in claim 1 wherein the acylating agent is a member selected from the group consisting of the anhydrides, halides and cyanides of low molecular weight aliphatic carboxylic acids, benzoic acid, low homologs of benzoic acid, p-toluene-sulfonic acid and ketene.

3. A process as defined in claim 1 wherein the acylating agent is acetyl chloride and the reaction is carried out at a temperature in the range of from 110° C. to 160° C.

4. A process as defined in claim 1 wherein the acylating agent is acetic anhydride and the reaction is carried out at a temperature in the range of from 110° C. to 160° C.

5. The process of claim 1, which comprises adding the oximinoacetone to a mixture of acylating agent and solvent heated to the reaction temperature.

6. The process of claim 1, wherein the acylating agent is acetyl cyanide and the reaction is carried out at a temperature in the range of from 110° C. to 160° C.

7. The process of claim 1, wherein the reaction-inert solvent has a boiling point above 120° C.

8. The process of claim 1. which comprises operating in continuous manner.

9. A process of the manufacture of hydrogen cyanide and acetic acid from oximinoacetone, which comprises dissolving oximinoacetone in acetic acid, adding 0.1–0.5 mol of a member selected from the group consisting of acetyl cyanide, acetyl chloride and acetic anhydride as acylating agent and decomposing the oximinoacetone at a temperature in the range of from 110° C. to 160° C. under a slight superatmospheric pressure.

10. A process for the preparation of hydrogen cyanide and acetic acid which comprises heating a solution of oximino-acetone in acetic anhydride to a temperature in the range of from 100° C. to 200° C.

11. A process for the preparation of hydrogen cyanide and acetic acid which comprises forming a reaction mixture by heating oximinoacetone with a catalytic amount of an organic acylating agent to a temperature in the range of from 100° C. to 200° C., said reaction mixture consisting essentially of acetyl cyanide, acyl-oximinoacetone, hydrogen cyanide and acetic acid in combination with said acylating agent, adding to the reaction mixture further amounts of oximinoacetone and withdrawing therefrom acetic acid and hydrogen cyanide.

References Cited by the Examiner

Degering, "An Outline of Organic Nitrogen Compounds," University Lithoprinters, Ypsilanti, Mich., 1944, pages 181 and 188.

Hurd, "The Pyrolysis of Carbon Compounds," American Chemical Society Monograph Series, The Chemical Catalogue Company, Inc., New York, 1929, page 667.

OSCAR R. VERTIZ, *Primary Examiner.*

MAURICE A. BRINDISI, *Examiner.*

E. C. THOMAS, *Assistant Examiner.*